(12) United States Patent
Grajkowski

(10) Patent No.: US 6,170,457 B1
(45) Date of Patent: Jan. 9, 2001

(54) FUEL INJECTION ENGINE HAVING FUEL SPRAY DEFLECTOR

(75) Inventor: Karl Grajkowski, Twin Lakes, WI (US)

(73) Assignee: Outboard Marine Corporation, Waukegan, IL (US)

( * ) Notice: Under 35 U.S.C. 154(b), the term of this patent shall be extended for 0 days.

(21) Appl. No.: 09/144,735

(22) Filed: Sep. 1, 1998

(51) Int. Cl.⁷ ...................................................... F02B 3/00
(52) U.S. Cl. ........................................ 123/298; 123/305
(58) Field of Search ................................ 123/298, 305, 123/169 PH

(56) References Cited

U.S. PATENT DOCUMENTS

| | | | |
|---|---|---|---|
| 2,438,288 | 3/1948 | Jacobson et al. | 318/28 |
| 4,123,998 | 11/1978 | Heintzelman | 123/32 K |
| 4,146,004 | * 3/1979 | Dubois | 123/169 PH |
| 4,851,732 | 7/1989 | Kashiwara et al. | 313/141 |
| 4,974,565 | 12/1990 | Hashimoto et al. | 123/299 |
| 5,601,061 | * 2/1997 | Dam et al. | 123/298 |
| 5,605,125 | 2/1997 | Yaoita | 123/275 |
| 5,720,252 | * 2/1998 | Blodgett et al. | 123/298 |
| 5,727,520 | * 3/1998 | Wirth et al. | 123/305 |
| 5,746,171 | * 5/1998 | Yaoita | 123/298 |
| 5,791,304 | 8/1998 | Taipale | 123/73 C |
| 5,878,726 | 3/1999 | Takahashi et al. | 123/516 |
| 5,927,244 | * 7/1999 | Yamauchi et al. | 123/298 |
| 6,003,488 | * 12/1999 | Roth | 123/298 |

FOREIGN PATENT DOCUMENTS

| | | |
|---|---|---|
| 197 49 295A1 | 5/1999 | (DE) . |
| 0839997A1 | 5/1998 | (EP) . |

* cited by examiner

Primary Examiner—John Kwon
(74) Attorney, Agent, or Firm—Fletcher, Yoder & Van Someren

(57) ABSTRACT

An internal combustion engine having fuel injection with a protrusion placed between a fuel injection nozzle and a spark plug in the combustion chamber. The protrusion shields the core nose of the spark plug, but not the gap between the center electrode and ground electrode of the spark plug. In this fashion, combustion is enhanced and carbon buildup on the porcelain body of the spark plug is prevented, thereby lessening the likelihood of a malfunction by the spark plug.

20 Claims, 2 Drawing Sheets

FUEL INJECTION ENGINE HAVING FUEL SPRAY DEFLECTOR

BACKGROUND OF THE INVENTION

1. Field of the Invention

The present invention relates to an internal combustion engine with a fuel spray deflector and more particularly to an internal combustion engine with a fuel injection system where the engine has an integrally formed fuel deflector that shields portions of a spark plug in the combustion chamber.

2. Description of the Related Art

It is well known that fuel deposited on the porcelain body portion of a spark plug located in a combustion chamber will cause the spark plug to short circuit and degrade engine operation. Fully functional spark plugs have longer lives, they provide for better engine fuel economy and they help reduce undesirable engine emissions. Nevertheless, it is desirable under certain operating conditions to directly inject fuel on the spark plugs so that more complete combustion occurs. This is especially true when the engine is at idle.

Prior attempts to shield portions of spark plugs in fuel injected engines have occurred. For example, it has been suggested that a rod may be inserted into a combustion chamber between the fuel injector nozzle and the spark plug to block fuel from portions of the spark plug. This arrangement offers a shield for the spark plug, however, the use of a rod requires extra engine parts, additional machining and increases the labor required for engine assembly.

BRIEF DESCRIPTION OF THE INVENTION

The disadvantages mentioned above have been overcome by the present invention. What is described here is an engine having fuel injection comprising an engine block having a cylinder, a piston moveable in the cylinder, a cylinder head connected to the engine block, a cavity formed in the cylinder head aligned with the cylinder, a first opening in the cylinder head communicating with the cavity for receiving a fuel injector nozzle, a second opening in the cylinder head communicating with the cavity for receiving a spark plug, and a protrusion formed integrally with the cylinder head extending into the cavity and positioned between the first and the second openings and adapted to divert fuel injected by a fuel injector nozzle mounted in the first opening away from selected portions of a spark plug mounted in the second opening.

An object of the present invention is to provide a mechanism for shielding a spark plug in a fuel injected engine. Another aspect of the present invention is to provide such a shielding mechanism which is a simple and inexpensive. Yet another advantage of the present invention is to provide a spark plug shielding mechanism which does not increase the number of parts in an engine, does not require extra machining of the engine elements and does not require additional labor for assembling such an engine.

A more complete understanding of the present invention and other objects, aspects, aims and advantages thereof will be gained from a consideration of the following description of the preferred embodiment read in conjunction with the accompanied drawings provided herein.

DESCRIPTION OF THE PREFERRED EMBODIMENT

Figure 1:
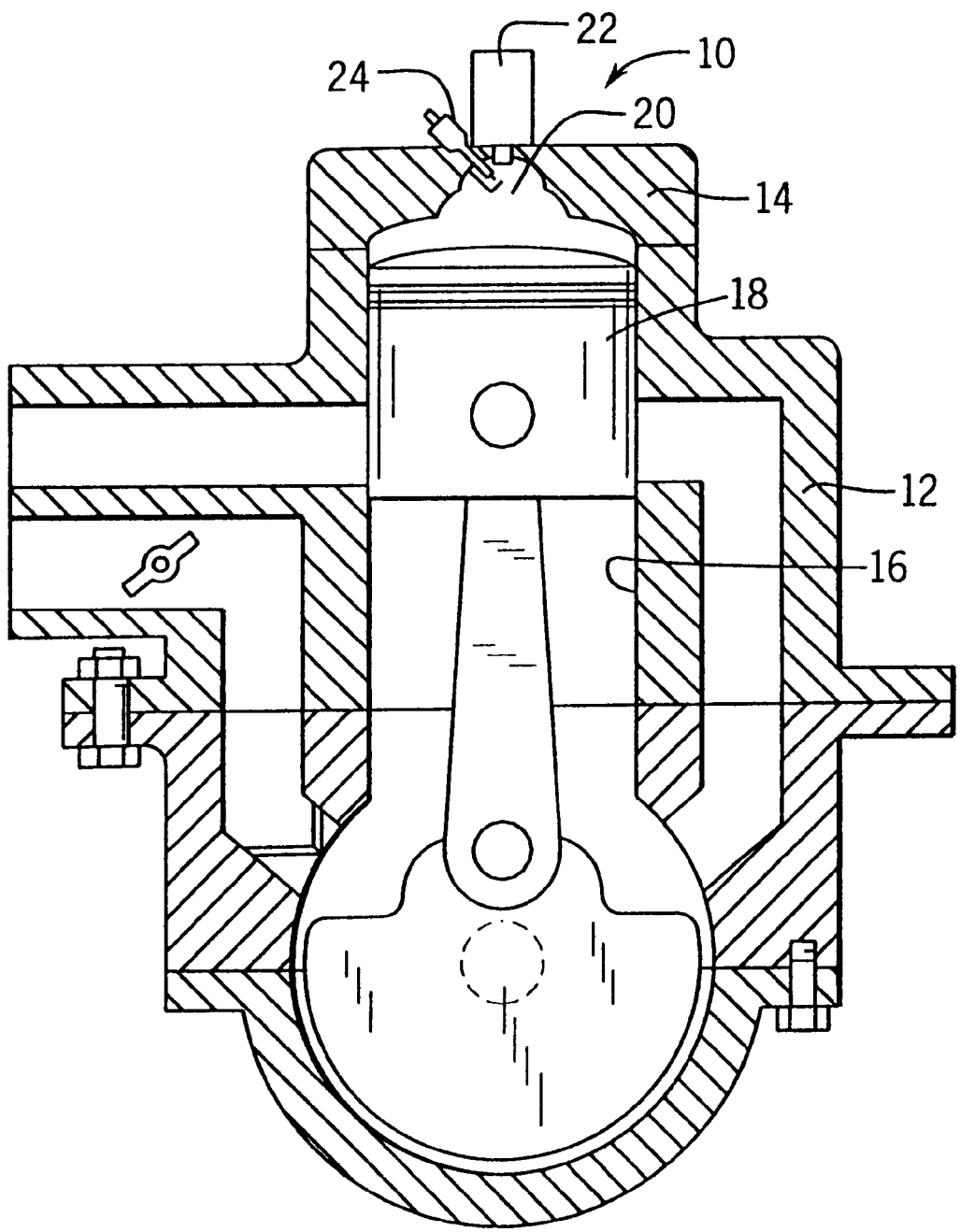
FIG. 1 is a diagrammatic, elevational, sectional view of a portion of a fuel injection internal combustion engine.

While the present invention is open to various modifications and alternative constructions, the preferred embodiment shown in the drawings will be described herein in detail. It is understood, however, that there is no intention to limit the invention to the particular form disclosed. On the contrary, the intention is to cover all modifications, equivalent structures and methods and alternative constructions falling within the spirit and scope of the invention as expressed in the appended claims.

Referring now to FIG. 1 there is shown a portion of an internal combustion engine 10 having direct fuel injection. The engine includes an engine block 12 and a cylinder head 14. A cylinder 16 is formed in the engine block and a piston 18 is moveable in a reciprocating fashion within the cylinder. There is a cavity 20 formed in the cylinder head. The cavity forms with the region above the piston a combustion chamber. Mounted to the cylinder head and in communication with the cavity is a fuel injector 22 and a spark plug 24. The construction and operation of fuel injection engines are known to those skilled in the art. For example the OMC Company of Waukegan, Ill. markets EVINRUDE and JOHNSON brand internal combustion engines with FICHT brand fuel injection technology.

Figure 2:
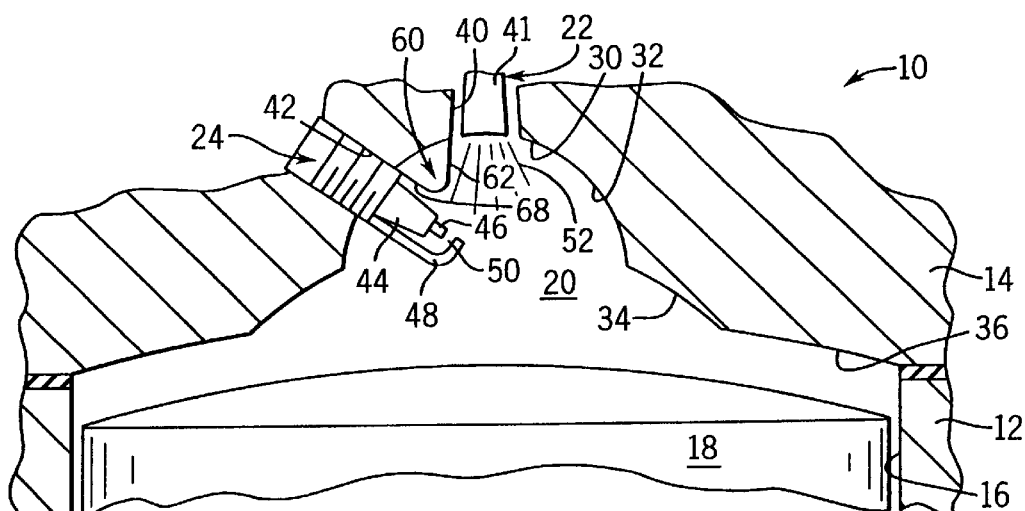
FIG. 2 is an enlarged diagrammatic, elevational, sectional view of the upper portion of a combustion chamber of the engine shown in FIG. 1.
Figure 3:
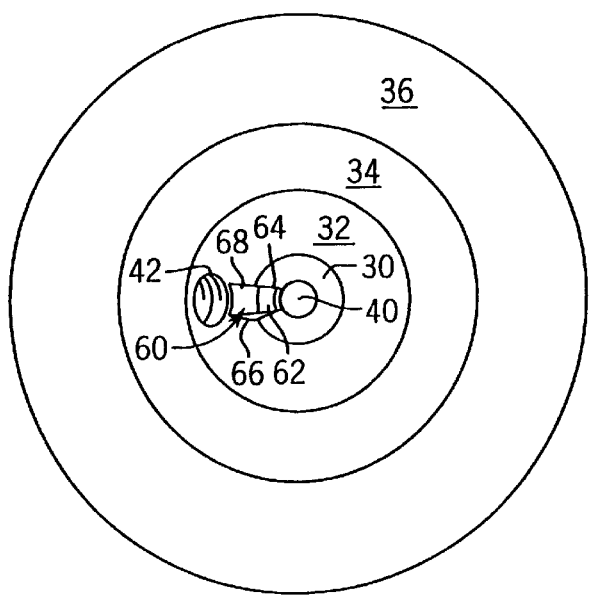
FIG. 3 is a bottom plan view of the cylinder head shown in FIG. 2.

Referring now to FIGS. 2 and 3 there is shown in more detail a portion of the internal combustion engine 10. The cavity 20 is formed by an upper wall 30, a curved side wall 32, a flared ring wall 34 and a lateral ring wall 36. Two openings are formed in the a cylinder head which open to the cavity. There is a first central opening 40 in the upper wall for receiving a nozzle 41 of the fuel injector 22 and a second side opening 42 in the curved side wall 32 for receiving a body portion of the spark plug 24.

As is best shown in FIG. 2, the central and side openings 40 and 42 are arranged so that the fuel injector nozzle and the gap end of the spark plug are in close proximity to each other. This facilitates quick and relatively complete combustion, especially at low throttle, such as at engine idle.

The spark plug 24 has the usual construction, including a porcelain body, a core nose 44, a central electrode 46, a ground electrode 48 and a spark gap 50 formed between the central electrode and the ground electrode.

The nozzle 41 of the fuel injector is illustrated dispensing fuel in a spray configuration resembling a cone 52. The operation and construction of a spark plug and of a fuel injector are known by those skilled in the respective arts.

Figure 4:
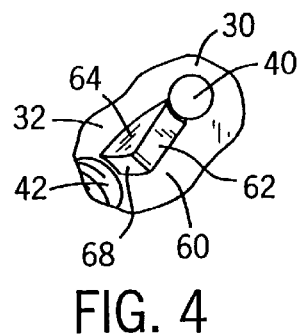
FIG. 4 is a diagrammatic perspective view of a portion of the cavity of the cylinder head shown in FIGS. 2 and 3 between an opening for a fuel injector and an opening for a spark plug.

To illustrate how simple and inexpensive a fuel deflector may be, reference is now made to FIGS. 2, 3 and 4. Formed integral with the cylinder head is a protrusion in the form of a small ramp-like structure 60. The protrusion includes a front wall 62, two side walls 64 and 66 and a bottom wall 68. The protrusion is cast or formed at the same time as the cylinder head, is made of the same material, typically aluminum, and is machined at the same time and in the same operations as those which form the two openings 40 and 42. For example, the injector nozzle opening 40 is bored in the cylinder head and at the same time the front surface 62 of the protrusion may be machined. In a similar fashion, the machining of the second opening 42 may be used to machine the bottom surface 68 of the protrusion. It may now be appreciated that the cost of adding of the protrusion is marginal. There is no added parts requiring additional machining or increased engine assembly labor costs.

The geometry of the protrusion is such that most of the spark plug core nose is shielded by the protrusion from the fuel that is sprayed through the nozzle. This minimizes carbon build upon on the porcelain core nose of the spark plug. The width of the front surface 62 is generally the same as the diameter of the core nose 44.

By shielding the spark plug, unwanted carbon deposits do not short the spark plug. Moreover, the gap 50 between the center electrode 46 and the ground electrode 48 is not shielded, and the spark or sparks that are generated by the spark plug during each power cycle will be within the cone of the fuel spray thereby facilitating fuel ignition.

In low speed, low load operation the nozzle injects fuel in a cone shaped pattern in the direction of the spark plug and the spark plug fires soon thereafter. The position of the protrusion is such as to shield the core nose of the spark plug from the fuel spray. However the spark plug gap is not shielded so that facilitated ignition may occur.

The specification above describes in detail an embodiment of the present invention. Other modifications and variations will under the doctrine of equivalents come within the scope of the appended claims. For example, making changes in width or geometry of the protrusion are considered equivalent structures. Also the location of the protrusion may be changed if the relationship between the nozzle opening and the spark plug opening in the cylinder head is changed. Still other alternatives will also be equivalent as will many new technologies. There is no desire or intention here to limit in any way the application of the doctrine of equivalents.

What is claimed is:

1. An engine having fuel injection comprising:
   an engine block having a cylinder;
   a piston moveable in said cylinder;
   a cylinder head connected to said engine block;
   a cavity formed in said cylinder head aligned with said cylinder;
   a first opening in said cylinder head communicating with said cavity for receiving a fuel injection nozzle, the nozzle being configured to deliver a single cone of fuel spray during operation;
   a second opening in said cylinder head communicating with said cavity for receiving a spark plug; and
   a protrusion extending into said cavity positioned between said first and said second openings and within the cone of fuel spray and adapted to deflect fuel of the cone injected by a fuel injection nozzle mounted in said first opening away from selective portions of a spark plug mounted in said second opening.
2. An apparatus as claimed in claim 1 wherein:
   said protrusion is in the form of a ramp.
3. An apparatus as claimed in claim 1 wherein:
   said cavity is formed by an upper wall and a side wall; and
   said protrusion extends from said upper wall to said side wall.
4. An apparatus as claimed in claim 1 wherein:
   said protrusion includes a front wall, a pair of side walls and a bottom wall.
5. An apparatus as claimed in claim 4 wherein:
   said front wall of said protrusion has a width selected based upon a width of a spark plug receivable in said second opening.
6. An apparatus as claimed in claim 5 including:
   a spark plug having a core nose; and wherein
   said front wall of said protrusion has a width of the same dimension as the diameter of said core nose.
7. An apparatus as claimed in claim 1 wherein:
   said second opening is constructed to engage a body portion of a spark plug such that a center electrode of said spark plug extends beyond said protrusion and into the path of fuel injected by said nozzle.
8. An apparatus as claimed in claim 1 wherein:
   said cavity is formed by an upper wall and a side wall;
   said protrusion extends from said upper wall to said side wall;
   said protrusion includes a front wall, a pair of side walls and a bottom wall; and
   said front wall of said protrusion has a width the same dimension as the diameter of a core nose of the spark plug received by said second opening.
9. An internal combustion engine having a block, a cylinder head and a piston, said cylinder head having a cavity formed therein, comprising in combination:
   a fuel injection nozzle mounted to said cylinder head and extending into said cavity and positioned to spray a single cone of fuel into said cavity;
   a spark plug mounted to said cylinder head, extending into said cavity and adapted to ignite fuel sprayed into said cavity;
   a shielding element extending into said cavity and disposed within the cone of fuel between said fuel injection nozzle and said spark plug for deflecting sprayed fuel from the cone from portions of said spark plug.
10. An apparatus as claimed in claim 9 wherein:
    said shielding element has a width equal to the diameter of that portion of the spark plug to the shielded.
11. An apparatus as claimed in claim 10 wherein:
    said spark plug includes a gap between two electrodes; and
    said shielding element has a height such that fuel sprayed by said nozzle is directed at least partially over said shielding element toward said gap.
12. An apparatus as claimed in claim 1, wherein said protrusion is formed integrally with said cylinder head.
13. An apparatus as claimed in claim 9, wherein said shielding element is integral with said cylinder head.
14. An internal combustion engine comprising:
    a block having a cylinder head, said cylinder head including a cavity;
    a spark plug mounted in the cylinder head and extending into the cavity;
    a fuel injection nozzle mounted within said block and extending into said cavity for injecting a single cone of fuel spray during operation; and a fuel spray deflector extending from said block into said cavity between said nozzle and said spark plug within the cone of fuel spray for deflecting sprayed fuel from the cone from portions of said spark plug.

15. An apparatus as claimed in claim 14, wherein said spark plug has a predetermined width within said cavity and said deflector has a width at least equal to said predetermined width.

16. An apparatus as claimed in claim 14, wherein said deflector is formed integrally with said cylinder head.

17. An apparatus as claimed in claim 14, wherein said spark plug has a pair of electrodes separated by a gap, and wherein said deflector has a height such that fuel sprayed by said nozzle is directed at least partially over said shielding element toward said gap.

18. An apparatus as claimed in claim 15, wherein said dimension is a diameter of a core nose of said spark plug.

19. An apparatus as claimed in claim 14, wherein said cavity is formed by an upper wall and a side wall, and said deflector extends from said upper wall to said side wall.

20. An apparatus as claimed in claim 14, wherein said deflector is in the form of a ramp.

* * * * *